US006532690B1

(12) United States Patent
Vachette et al.

(10) Patent No.: US 6,532,690 B1
(45) Date of Patent: Mar. 18, 2003

(54) SYSTEM AND ARTICLE FOR DISPLAYING A LENTICULAR IMAGE WITH SOUND

(75) Inventors: Thierry Vachette, Esbarres (FR); Joseph A. Manico, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/140,215

(22) Filed: Aug. 26, 1998

(51) Int. Cl.⁷ .............................. A47G 1/06; G09F 1/00
(52) U.S. Cl. .............................. 40/454; 40/455; 40/463
(58) Field of Search ................ 40/454, 455, 457, 40/463, 453, 482, 484

(56) References Cited

U.S. PATENT DOCUMENTS

| 3,557,324 A | | 1/1971 | Nakamatsu |
| 4,265,159 A | | 5/1981 | Liebman et al. |
| 4,693,694 A | | 9/1987 | Seki |
| 5,032,099 A | * | 7/1991 | Chan ........................ 446/175 |
| 5,499,465 A | | 3/1996 | Manico |
| 5,520,544 A | | 5/1996 | Manico et al. |
| 5,574,519 A | | 11/1996 | Manico et al. |
| 5,737,087 A | | 4/1998 | Morton et al. |
| 5,803,564 A | * | 9/1998 | Bruinsma et al. ............. 353/10 |
| 6,125,190 A | * | 9/2000 | Wen ............................ 40/454 |

FOREIGN PATENT DOCUMENTS

GB    2304252    3/2000

* cited by examiner

*Primary Examiner*—Cassandra H. Davis
(74) *Attorney, Agent, or Firm*—Frank Pincelli (57) ABSTRACT

An article having an lenticular image formed thereon and a sound generating mechanism associated therewith for generating a sound message, the sound message being coordinated with respect to movement of the article. A mechanism for moving the lenticular image along a predetermined path may also be provided and for coordinating the sound message with the movement of the lenticular image. Different sound segments may be activated with respect to the line-of-sight or distance of the observer with respect to the lenticular image.

2 Claims, 11 Drawing Sheets

SYSTEM AND ARTICLE FOR DISPLAYING A LENTICULAR IMAGE WITH SOUND

FIELD OF THE INVENTION

This invention relates to the field of lenticular images having multiple images embedded. Each individual image can be seen by an observer depending on the angular position of the lenticular image and the observer relative to each other. These images can be still images or a series of related images like in a movie rotating images or depth images. Lenticular images, when they are moved relatively to one each other or tilted back and forth, display a succession of images. These lenticular images are made using well known technologies, such as grids, rods, or lenticular arrays of lenses, which allow display of only one image at a time.

BACKGROUND OF THE INVENTION

U.S. Pat. No. 5,574,519, issued to Manico et al on Nov. 12, 1996, discloses a talking photo album capable of displaying a plurality of still images and having an audio system for selectively storing and playing back audio information corresponding to displayed still images.

U.S. Pat. No. 5,520,544, issued to Manico et al on May 28,1996, discloses a talking picture album where a sound message is played according to the picture displayed. The playback of a pre-recorded message associated with the information displayed on this page is optically coupled to the photo-detector by light pipes mounted with each album page.

U.S. Pat. No. 5,499,465, issued to Manico on Mar. 19, 1996, discloses a talking picture frame. The frame houses a digital sound system which is enabled when the frame is moved. The digital sound system contains a message which enable the picture viewer to enjoy it further.

U.S. Pat. No. 4,265,159, issued to Liebman et al on May 5, 1981, discloses a sound responsive color organ including a transducer which converts sound to electricity. The transducer is connected to an amplifier which is used to control switching devices that turn on and off light in a display situated behind a color mask. Located in front of the color mask is a lenticular surface which further affects the light sources.

U.S. Pat. No. 3,557,324, issued to Nakamatsu on Jan. 19, 1971, discloses a sound device for television receivers having means for emitting or reflecting sound in front of the screen to direct the sound toward a viewer, so that the sound can be heard as if it were emanating from the picture screen of the television receiver.

However, the devices disclosed in these references do not provide means for combining dynamic still images, such as the lenticular type, with sound.

It is extremely desirable to provide the observer of a lenticular image with the ability to hear sound at the same time, which is related to or coordinated with the viewing of images provided in the lenticular image. It is known that memories are not only related to vision, but also to other senses. One important sense is hearing, which when combined with a lenticular image provides added value for memories. Motion pictures, television and video are examples where sound coupled with moving images provide strong memories and emotional effect. However, the production and use of motion pictures, television programs and video programs are quite expensive to produce and require expensive equipment to use. Therefore, it is highly desirable to provide the user with means for keeping in mind or transmitting sound information about the content of relatively inexpensive and portable means for displaying a sequence of images with sound messages. The present invention provides means for playing a sound message associated to a series of images that is relatively inexpensive and which can be easily personalized or modified.

An object of the present invention is to provide the observer of a lenticular image with a sound mean associated to the lenticular image for providing sound messages. This lenticular image can be of any type including depth images, rotating images, multiple images, or different types of images with a relationship between them like in a movie. The sound messages can be either music, comments, notes, voice, or any combination of them played sequentially or together.

In another object of the present invention, there is provided a sound message associated with a series of images having a relationship to the images being displayed.

In yet another object of the present invention, there is provided a lenticular image wherein the sound message provided is a part of the same theme to the series of images.

In yet another object of the present invention, there is provided a lenticular image wherein the sound message is coordinated with the series of images being displayed.

These objects are given only by way of illustration, thus, other desirable objects and advantages inherently achieved by the disclosed invention may occur or be apparent to those skilled in the art. The invention is defined by the pending claims.

SUMMARY OF THE INVENTION

In accordance with one aspect of the present invention there is provided an article placed at a fixed position, said article having a lenticular image formed thereon and a sound generating mechanism associated therewith for generating a sound message, said lenticular image having a plurality of different images, said sound message having a plurality of different sound segments, each of said sound segments is associated with respect to a different predetermined line of sight with respect to said article, said sound generating mechanism having a sensor for determining a line of sight of a moving observer with respect to said article at said fixed position and for activating one of said sound segments in response in a predetermined relationship between said line of sight of said observer and one of said different predetermined line of sights.

In accordance with another aspect of the present invention, there is provided an article having a lenticular image formed thereon and having a sound generating mechanism associated therewith, said lenticular image having a plurality of different images, each image being associated with a particular orientation for viewing one of said plurality of different images, said sound generating mechanism having a plurality of different sound segments, each sound segment being associated with one of said orientations for viewing, said plurality of sound messages are initiated by a switch having a shell containing a conductive liquid and a plurality of contacts, each of said plurality of contacts extending a different distance into said chamber and each being successively activated in response to orientation of said switch.

In accordance with yet another aspect of the present invention, there is provided a method for generating a sound message with respect to a fixed lenticular image in response to movement of an observer with respect to said fixed lenticular image, comprising the steps of:

providing a lenticular image on an article having a plurality of different images capable of being viewed at different lines of sight with respect to said lenticular image;

sensing the line of sight of an observer as the observer moves with respect to said fixed lenticular image; and producing different sound segments in relationship with different lines of sight being monitored.

In still another aspect of the present invention, there is provided a system for displaying a lenticular image and generating a sound message, comprising:

a lenticular image having a plurality of images;

a mechanism for moving the lenticular image along a predetermined path; and a mechanism for generating a sound message coordinated with respect to movement of the lenticular image.

In another aspect of the present invention, there is provided an article having a lenticular image formed thereon and having a sound generating mechanism associated therewith for generating a sound message. The lenticular image having a plurality of different images and the sound message having a plurality of different sound segments, each sound segment is activated with respect to the line of sight of the observer for each of the different images of the article.

These and other features of the present invention are described in detail in the detail description of the invention that follows.

BRIEF DESCRIPTION OF THE DRAWINGS

In the detailed description of the preferred embodiments of the invention presented below, reference is made to the accompanying drawings in which:

FIG. 14b is a back view of the modified integral image of FIG. 14a;

DETAILED DESCRIPTION OF THE INVENTION

The present invention is directed to an article of manufacture having a lenticular image or a series of images which may be viewed or displayed and a sound generating device or mechanism for generating sound messages in association therewith. For the purposes of the present invention, a lenticular image shall mean an article having at least two individual images wherein each of the individual images are viewed by an observer in response to relative motion between the observer and the article. An example of a lenticular image is illustrated by U.S. Pat. No. 5,737,087, issued to Morton et al on Apr. 7, 1998, motion based hard copy imaging. The individual images can be a series of depth images, a flip or a motion sequence.

Figure 1:
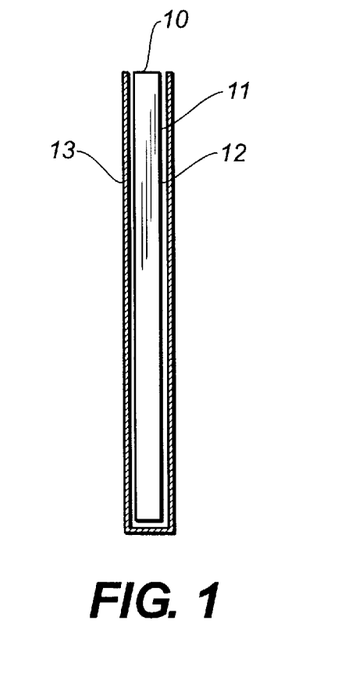
FIG. 1 is a side view of an integral image inserted into a cradle.
Figure 2:
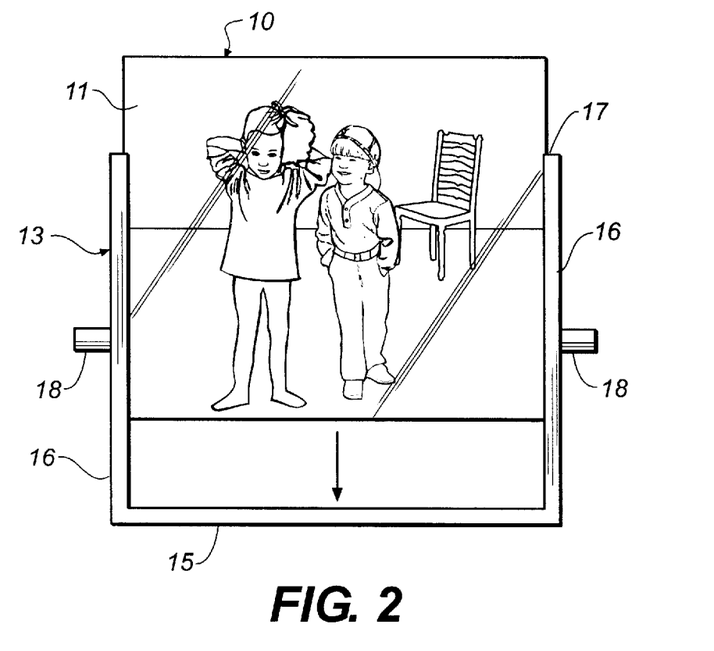
FIG. 2 is a front view of an integral image being inserted into a cradle.
Figure 3:
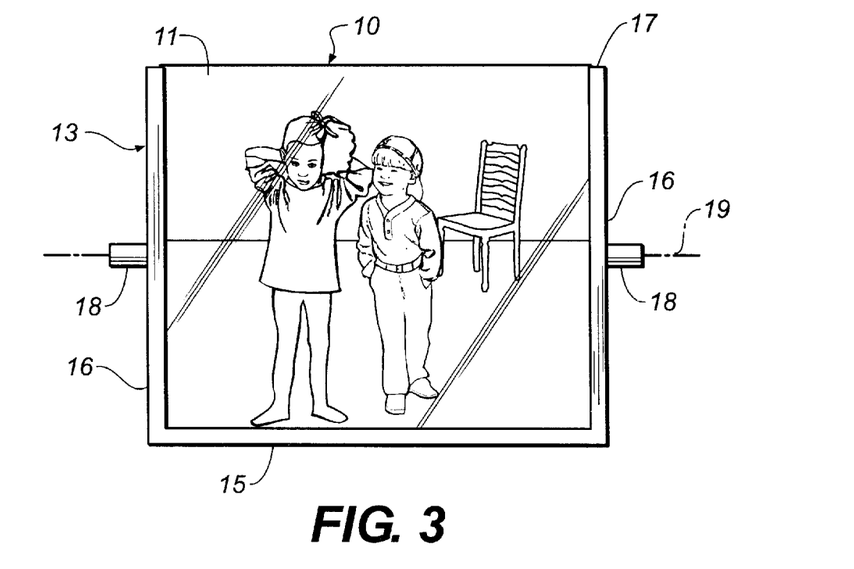
FIG. 3 is a front view of an integral image inserted in a cradle having its axis of rotation in the middle of the cradle.

Referring to FIG. 1, there is illustrated an article 10 having a lenticular image 11 provided on the front surface 12 of the article 10. Preferably, as illustrated, the lenticular image is integrally formed as part of article 10. The lenticular image 11 comprises at least two individual images which can be viewed in sequence by relative motion between the observer and the article 10. It is to be understood that the lenticular image may comprise any desired number of individual images. Presently, a lenticular image typically comprises from about three to ten individual images. In the particular embodiment illustrated, lenticular image 11 comprises six images. Article 10 is placed in a cradle 13. As shown on FIG. 2, the cradle 13 designed to hold the article 10 by the bottom 15 and the sides 16, so that it can be easily inserted from the top 17 of the cradle 13. As shown on FIG. 3, the cradle 13 also has two pins 18 extending from the lateral parts of the sides 16, which allow to rotate or rock cradle 13 about axis 19 and thus the integral lenticular image 11 about axis 19.

Figure 4:
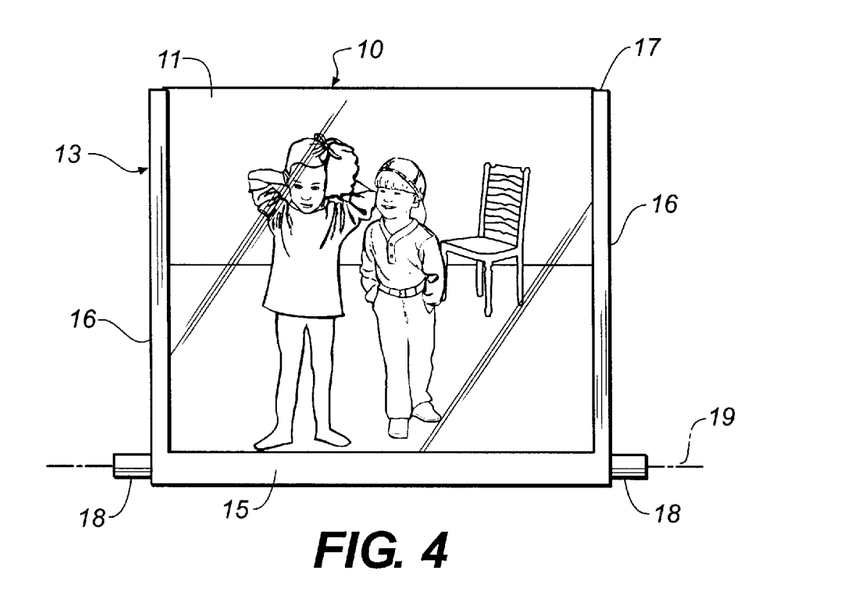
FIG. 4 is a front view of an integral image inserted in a cradle having its axis of rotation at the bottom of the cradle.
Figure 5:
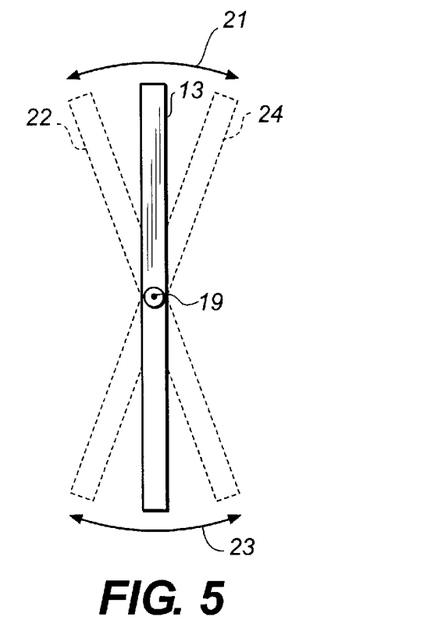
FIG. 5 is a schematic side view of the rocking motion of an integral image when the axis of rotation is in the middle of the cradle.

Axis 19 may be located at any desired location along the cradle 13, for example, on the bottom of the cradle 13 as shown on FIG. 4. Other possibilities include, but are not limited to, placing the article 10 into a device which has the ability to rock itself. The axis 19 provides the rocking motion, as indicated by arrow 23, in the middle of the cradle holding the integral lenticular image 11. Arrow 21 in FIG. 5 illustrates the direction in which the integral lenticular image 11 is moved between two extreme positions 22, 24. In this case, the amplitude of the movement is the same at the top and at the bottom of the integral lenticular image 11. The two extreme positions 22, 24 correspond to the first and the last individual images to be displayed or viewed which are not necessarily all the images embedded into the integral lenticular image 11. As the lenticular image 11 is rotated between the extreme positions 22, 24, all of the individual images of lenticular image 11 can be seen by an observer.

Figure 6:
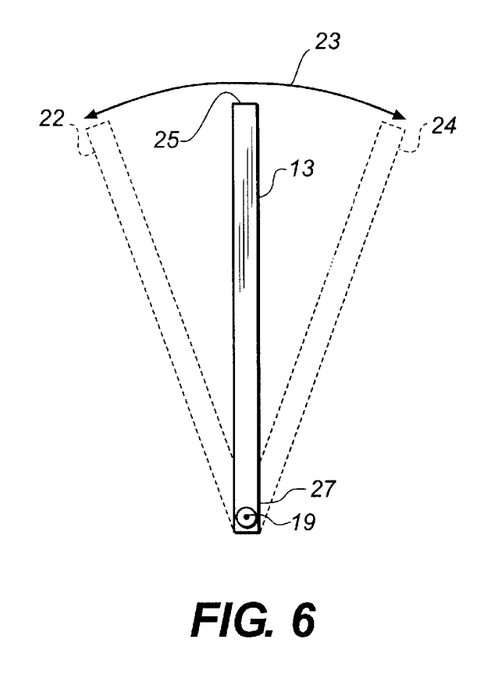
FIG. 6 is a schematic side view of the rocking motion of an integral image when the axis of rotation is at the bottom of the cradle.

FIG. 6 shows the same rocking motion about axis 19, as indicated by arrow 23, which is located at the bottom of the cradle 13 holding the lenticular image 11. In this case, the amplitude of the rocking motion, indicated by arrow 23, between the two extreme positions 22, 24 is much wider at the top 25 of the integral lenticular image 11 than at the bottom 27. The same configuration can be applied having the axis 19 located at the top of the cradle with the opposite result in amplitude.

Figure 7:
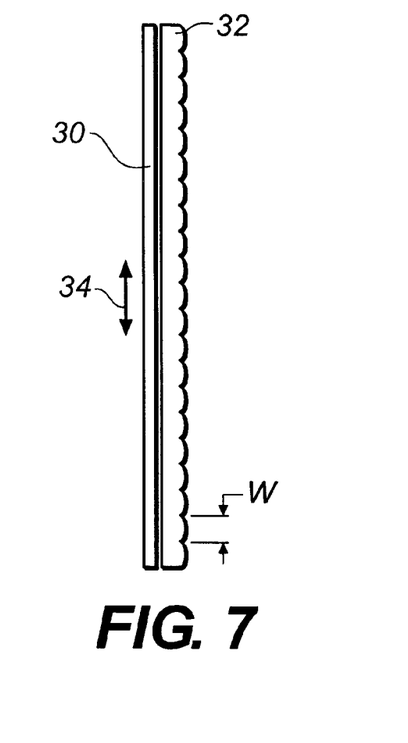
FIG. 7 is a side view of a lenticular image sliding behind a lenticular sheet.

In the previous embodiments, viewing of the individual images in lenticular image 11 occurs through movement of the entire article 10. Another way to display the individual images embedded in lenticular image 11 can be accomplished when the individual images are not integrally part of article 10. For example, when the lenticular image 11 comprises a lenticular sheet 30 it includes a plurality of images behind a separate lenticular lens 32 as shown on FIG. 7. In order to view all of the individual images, the lenticular sheet 30 must be close to lenticular lens 32, but free for relative movement thereto. By providing a translation movement 34 to the sheet 30 perpendicularly to the lens 32, all the images embedded in the lenticular sheet 30 image are successively displayed. The amplitude of the translation to display all the embedded images in sheet 30 is of the order of magnitude of the width W of the lenticules 36 on the lenticular sheet 30.

Figure 8:
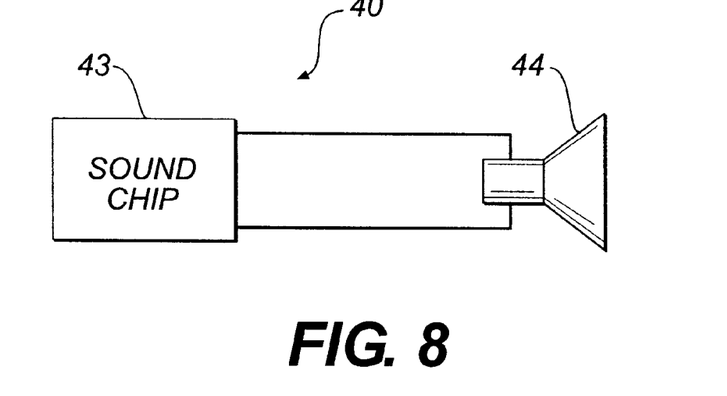
FIG. 8 is a schematic view of a sound system including a sound chip and a speaker.

A sound playback system that can be associated to the integral lenticular image 11 will now be described. Referring to FIG. 8, a sound playback system 40 is illustrated for use in the present invention. In the embodiment illustrated, the sound system 40 includes a sound chip 43 having a pre-recorded sound message. In the embodiment illustrated, the chip 43 is of the kind widely used in answering machines, or in toys and a speaker 44. However, the chip may be of the type that may be recorded by the user with any desired sound message or any other type desired. The sound chip 43 can be activated by mechanical action like pushing a switch (not shown), which can be a part of the sound chip 43 (or a separate item), or by an electronic action where an electronic input to the sound chip 43 is brought to a given voltage which starts operation of the sound chip.

Figure 9:
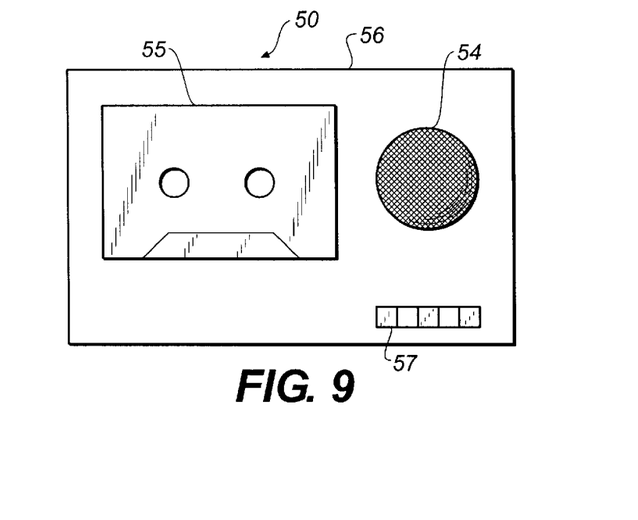
FIG. 9 is a schematic view of an audio tape player.

Another preferred sound playback system 50 is shown in FIG. 9. In this embodiment there is provided an audio tape cassette 55 containing an audio sound message to be played either in an analog or digital form, and an audio tape player 56. The audio message is played through a speaker 54 which is a part of the audio tape player 56. The audio tape player 56, in the embodiment illustrated, includes a series of electronic connector 57 which are used to drive the system 50 accordingly to a preset sequence. The preset sequence comprises a series of audio messages (message segments) of a given length that are played each time the appropriate connector 57 is activated. This arrangement is particularly suited when a sequence of individual images are to be viewed.

The system 50 of FIG. 9 may be modified by replacing the electronic connector by a mechanical system, like a button, or a series of buttons. Another modification comprises replacing the audio tape cassette by an audio disk, like an audio CD, which adds the possibility to playback tracks in a random order. It is to be understood that any other appropriate source of sound messages may be employed that is currently available or that may arise in the future.

Figure 10:
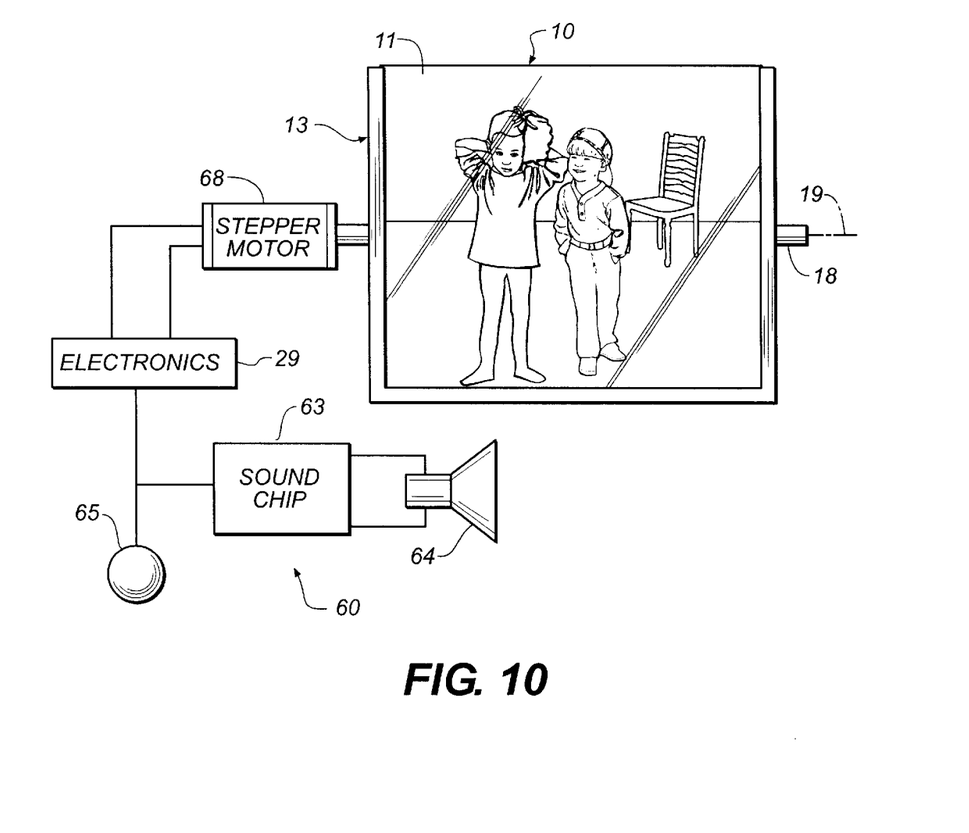
FIG. 10 is a schematic view of the assembly of the synchronization means comprising a motor coupled to the integral image and a sound chip, both being triggered by a button.

Referring to FIG. 10 there is illustrated a system 60 adapted for playing of a sound message or messages accordingly to a motion sequence of the lenticular image 11 placed in a cradle 13 having a rotational motion sequence about axis 19. The cradle 13 is mechanically linked to an electric motor 68, which is driven by an appropriate electronics 29. In the embodiment illustrated, motor 68 is a stepping motor, however, motor 68 may be of any suitable type construction. During initialization of motor 68 and its associated electronics, that is to say right after the system is switched on, the motor 68 comes to a default position by means of electronics. This default position corresponds to the display of the first image of the series of images embedded in the integral lenticular image 11 for an observer positioned in front of the system where the individual images are supposed to be viewed. The system 60 also contains a sound chip 63, a speaker 64, and a button 65 to activate the system 60. When the observer presses the button 65, it simultaneously activates the sound chip 63 so that the audio message is played and the motor electronics operates motor 68 so as to rotate the lenticular image 11 at a rate such that the individual images embedded into the lenticular image 11 are displayed in synchronization with the audio message. The data necessary for the synchronization of the rate of movement of the lenticular image 11 can be sampled during the construction of the integral lenticular image 11. For example, a motion sequence is most of the time obtained from a video or film sequence. In the typical case, the frame rate of the video and the film sequence is well known and one can determine what is the sub-sampling rate appropriated for the construction of the integral image. On the other hand, the sound message can be the sound track of the video or film sequence which is sampled from the first frame to the last frame of the lenticular image 11. As a result, one can calculate the appropriate rotation of the motor 68 to display the individual images to the observer in synchronization with the audio playback. The appropriate data may be embedded into the motor electronics, for example, like in a stepping motor 68 electronics where sequences of commands can be stored and then activated as desired. It is to be noted that the sub-sampling rate does not have to be constant. Many individual images can be displayed when a lot of action is present and less individual image when there is less action. The appropriate motion sequence for the motor may determined or selected as desired for each case.

Figure 11:
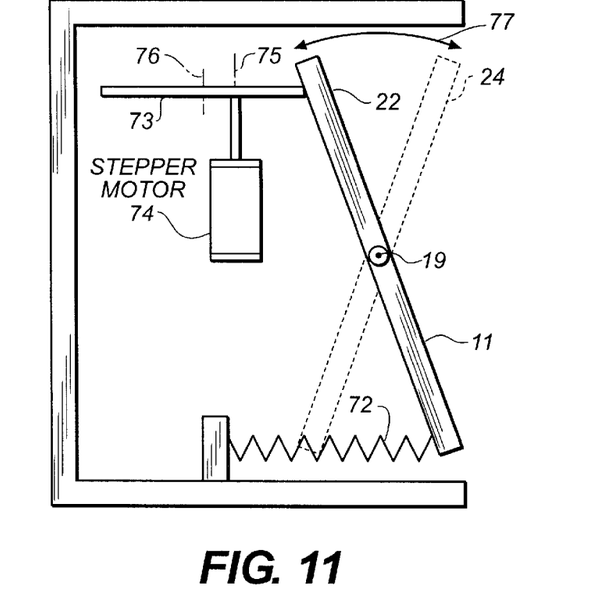
FIG. 11 is a schematic side view of a gear and spring system creating the motion of an integral image.

The mechanism used to provide motion to integral lenticular image 11 may be varied. For example, referring to FIG. 11, the integral lenticular image 11 can rock around an axis 19 by the mechanism 70 illustrated. In this embodiment the integral lenticular image 11 is biased forward by a spring 72. Spring 72 may be of any type desired, for example, a coil spring as illustrated, or a blade. At the top of the integral lenticular image 11, a gear 73 coupled to an electric motor 74 pushes forward the lenticular image 11. This gear 73 can be of one of the following types in order to induce a back and forth motion of the upper part off the integral lenticular image 11 and thus impart a rocking motion to the lenticular image about axis 19. The gear 73 can be an eccentric gear, that is, a gear which is cylindrical and the axis of rotation 75 is not at the center 76 of the gear 73, but slightly off center so that when rotating, the lenticular image is pushed back and forth, the gear 73 can also be designed so that the distance from the axis of rotation to the periphery varies in such a way that the top of the lenticular image 11 is a back and forth motion, as indicated by arrow 77. It is to be noted that in this second case the periphery of the gear 73 can be designed in such a way that a plurality of back and forth motions can take place while the gear 73 performs one rotation, and furthermore, in this case, all the individual images embedded into the lenticular image 11 are not necessarily displayed during all the back and forth motions taking place during one rotation of the gear 73.

Figure 12:
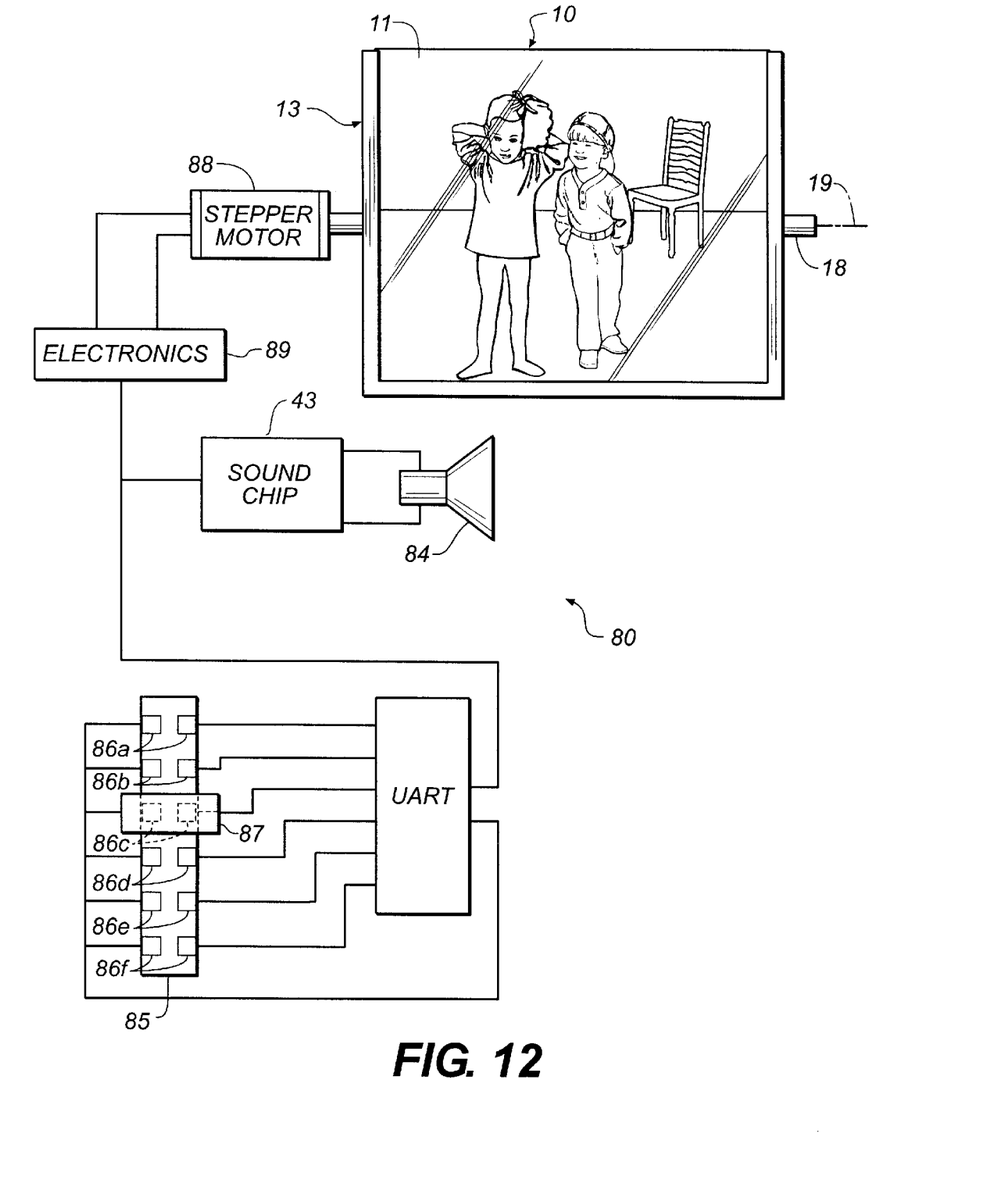
FIG. 12 is a schematic view of the assembly of the synchronization means comprising a motor coupled to the integral image and a sound chip both being triggered by a slider means.

FIG. 12 illustrates a system 80 which is particularly adapted to the playback of an audio message accordingly to a plurality of sequence images. An integral lenticular image 11 is set into a cradle 13 which can rotate around an axis of rotation 19. An electric motor 88 is coupled to the cradle 13 through the rocking axis 19 of the cradle 13. The electric motor 88 is driven by an appropriate electronics 89. The system 80 also includes a speaker 84 and a sound system, preferably a sound chip 43, which can deliver on demand an electric signal to the speaker 84 and thus play a pre-recorded audio sound message. The system 80 also includes a slider 85 having a series of paired electrical connectors 86a, 86b, 86c, 86d, 86e and 86f on each side. A sliding member 87 makes electrical connection between two facing (associated) connectors 86 on the slider 85, thus providing a specific electronic circuitry with the information that one connection is activated while all the others are non-activated. This circuitry, of the type UART, converts all the input entries, each corresponding to a pair of connectors 86a, 86b, 86c, 86d, 86e and 86f on the slider 85 into a stream of digital signals encoded as a series which the connector is activated. The circuitry also transforms a parallel signal into a series signal. This information is provided to the motor driver, which is able to position the integral image to a specific individual image of lenticular image 11 by rotating the integral lenticular image 11 to a pre-recorded angle, and to the sound chip 43 which is able to play a specific audio message accordingly to the incoming electric signal.

Figure 13:
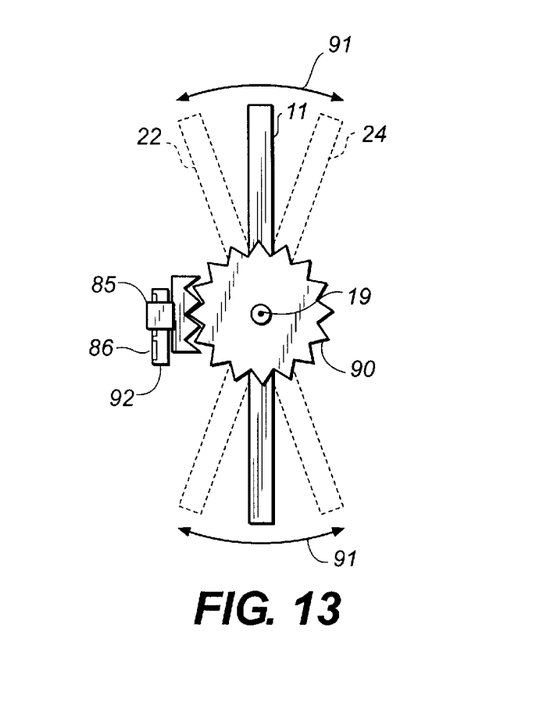
FIG. 13 is a side view of the mechanical assembly of a slider means, a gear and an integral image.

The electric motor 88 can be advantageously replaced by a mechanical means coupling the slider 85 with the cradle 13 as shown on FIG. 13. This mechanical coupling can be a gear, a plurality of gears, a belt, a plurality of belts, or a combination of any of them. The slider 85 can be a linear slider or round slider, like a thumbwheel, as shown on FIG. 13. The lenticular image 11 is coupled through an axis 19 to a gear 90, which is actuated by a back and forth motion, indicated by arrow 91, of a slider means 85 along a rail 92 and thus provides the rocking motion of the lenticular image 11 between the two extreme positions 22, 24. In addition to that, a series of connectors 86 provides electrical information through the contact between two facing connectors and the slider. This electrical information is used for activating a sound chip as in the previous example through the UART. It has to be understood that the sound chip 43 can be one sound chip 43 having features for storing a plurality of audio sound messages and playing them back independently or a plurality of sound chips, each one storing one audio sound message which can be played back on demand.

Figure 14A:
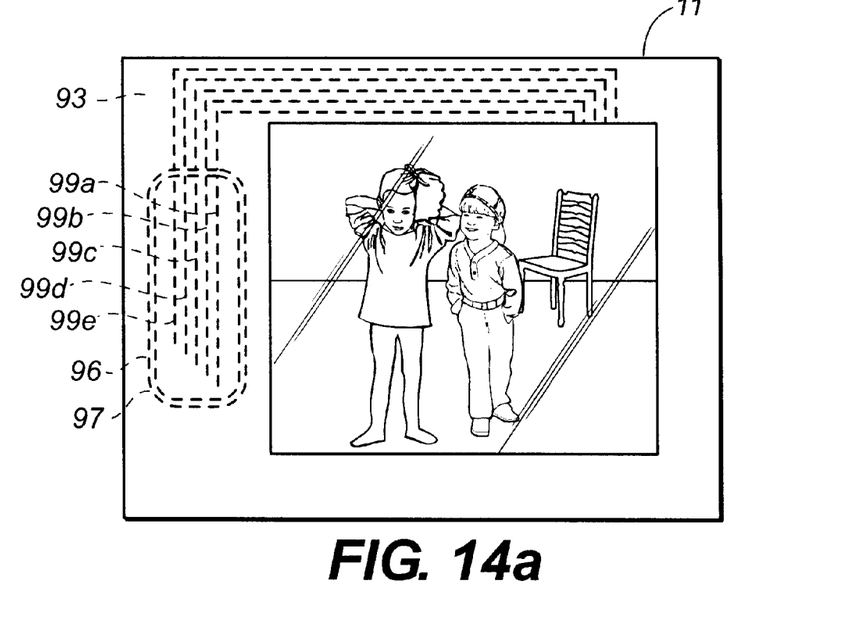
FIG. 14a is a front view of a modified integral image made in accordance with the present invention.
Figure 14B:
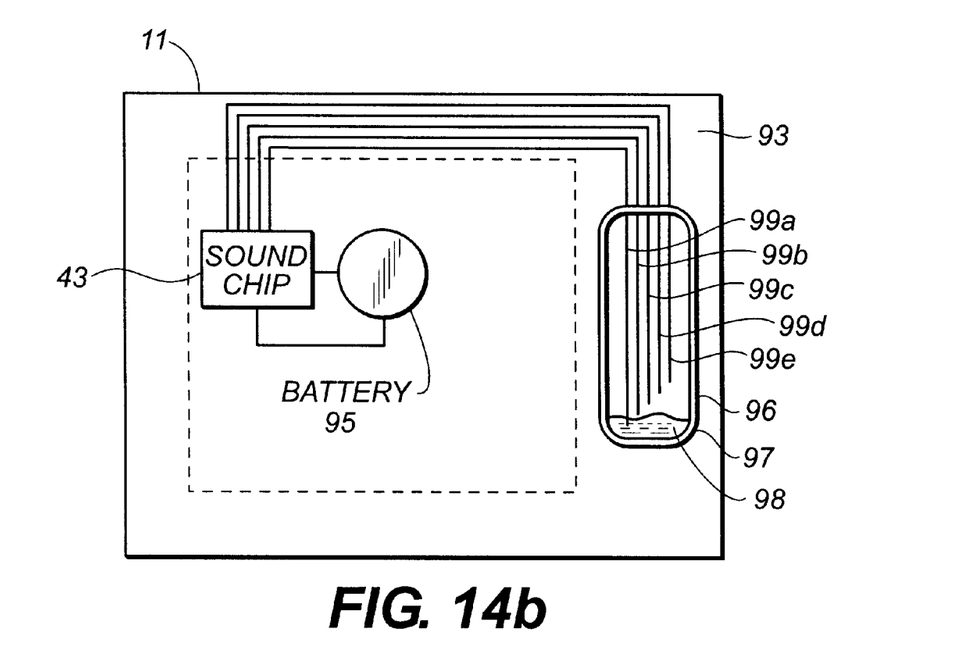
Figure 15A:
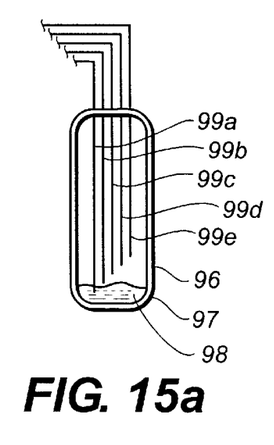
FIG. 15a–15e illustrate a switch for use with the lenticular image of FIGS. 14a and 14b as it is moved through various activation positions.
Figure 15B:
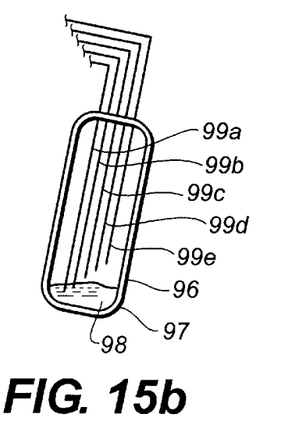
Figure 15C:
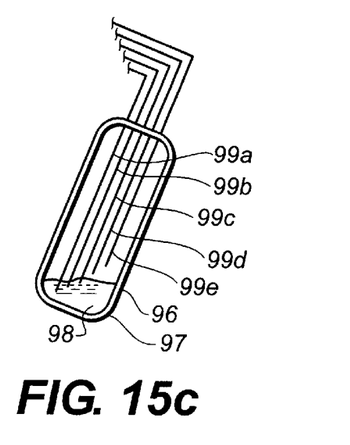
Figure 15D:
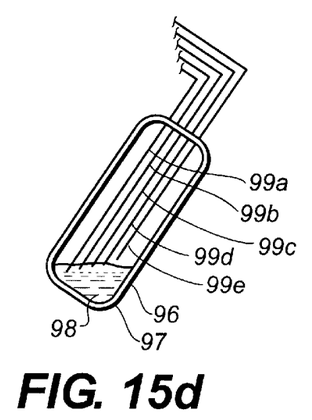
Figure 15E:
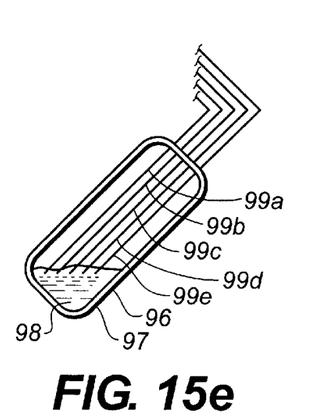

Referring to FIGS. 14a and 14b, there is illustrated another embodiment of the present invention, like numerals indicating like parts, as previously discussed. In this embodiment, a sound chip 43 and switch 96 are secured to the back side 93 of the lenticular image 11. An appropriate battery 95 is also secured to the back of integral lenticular image 11 for providing electrical power to sound chip 43. Sound chip 43 and switch 96 are secured to the back side of image 11 by any desired means, for example, but not by way of limitation, adhesive, tape, and so forth. Switch 96 is electrically connected to battery 95 and is used for activation of sound chip 43. As illustrated in detail by sequence in FIGS. 15a–15e, switch 96 is designed to respond to the position and/or movement of the image 11. Switch 96 comprises a shell 97 having a conductive liquid 98 therein and a plurality of electrical contacts 99a, 99b, 99c, 99d, and 99e. As the shell 97 is moved through the various positions illustrated in FIGS. 15a, 15b, 15,c, 15d and 15e, electrical contact is made with various contacts 99a, 99b, 99c, 99d, and 99e in progression. As the conducive liquid 98 progressively contacts each of the contacts 99a, 99b, 99c, 99d, and 99e, a different electrical circuit is closed thereby activating a different sound message. Appropriate electronics (not shown) may be provided such that the sound messages associated with each contact is played in a desired (pre-programmed) sequence.

Figure 16:
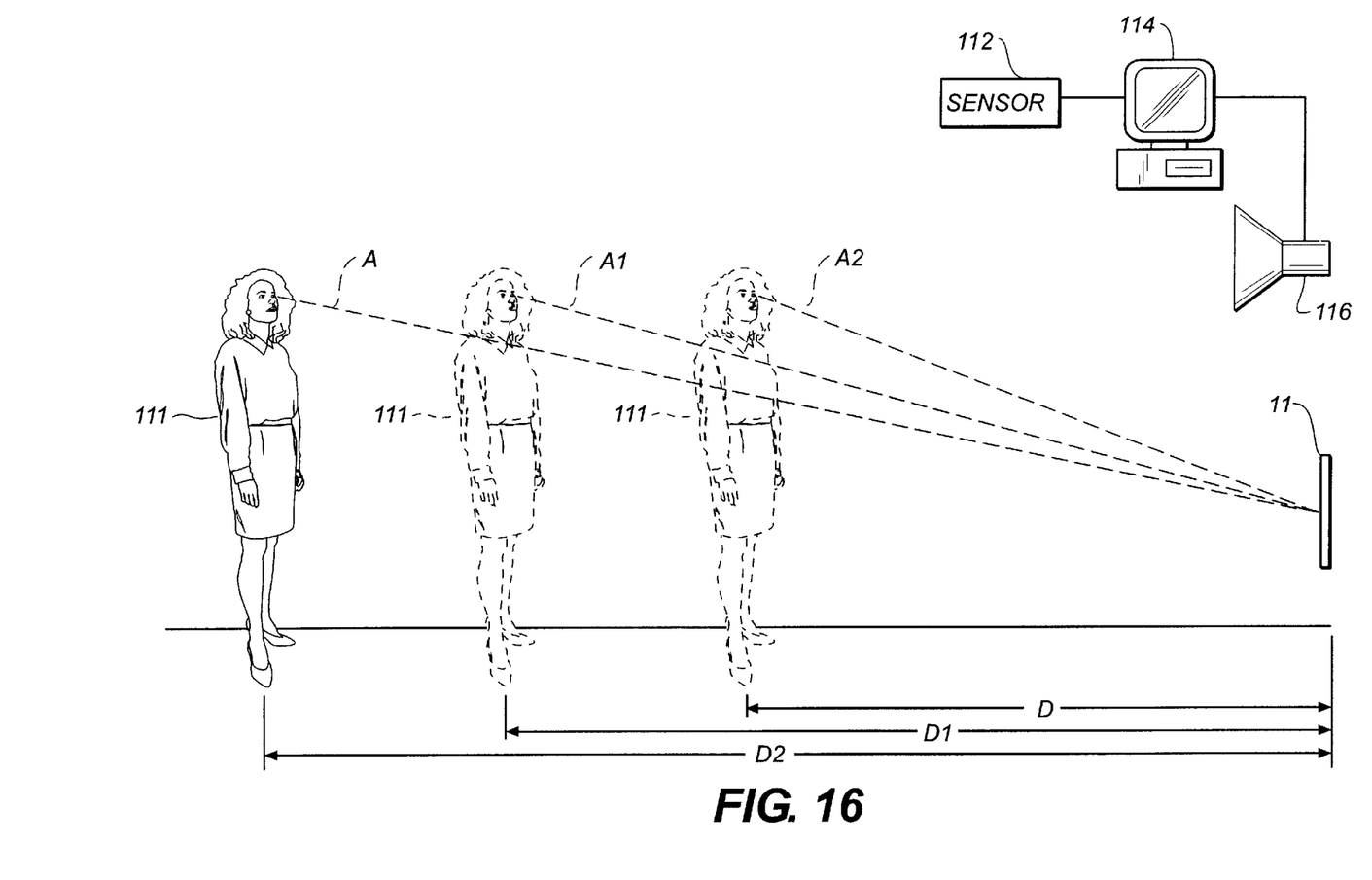
FIG. 16 is a schematic diagram of another system made in accordance with the present invention.

In the embodiments previously discussed and illustrated, the lenticular image 11 is moved in order to provide the viewing of the multiple images contained therein by the observer. However, the present invention is not so limited. For example, referring to FIG. 16, there is illustrated a system 110 wherein the lenticular 11 is placed in a fixed position and the observer 111 moves with respect to the lenticular image 11 whereby the various images contained thereon are displayed. As illustrated in FIG. 16, the observer has an initial line of sight "A" with respect to the image 11. As the observer 111 moves various lines-of-sights, A, A1, and A2 are visually perceived by the observer 111, each line-of-sight being associated with one of the individual images. An appropriate sensor 112, such as a motion sensor, is used to detect the position of the observer 111 as the observer approaches the lenticular image 11. The motion sensor may be of any desired construction, for example, but not by way of limitation, an infrared or ultrasonic type construction. The information relating the distance D, D1 and D2 of the observer with respect to image 11, which relates directly to the line-of-sight of the observer 11, is passed onto a computer 114, which is then used to control the sound reproducing mechanism 116 which can start playing of the audio message when the observer is positioned a predetermined distance from the lenticular image 11, or has a particular line-of-sight. The audio message may simply be played upon the observer reaching a predetermined distance D, D1, and D2 (different lines-of-sight "A", "A1", "A2", and so forth) with respect to the image, or played in response to the rate of movement of the observer with respect to the image 11. Additionally, a plurality of different sound segments may be provided and played in coordination with the position of the observer.

Figure 17:
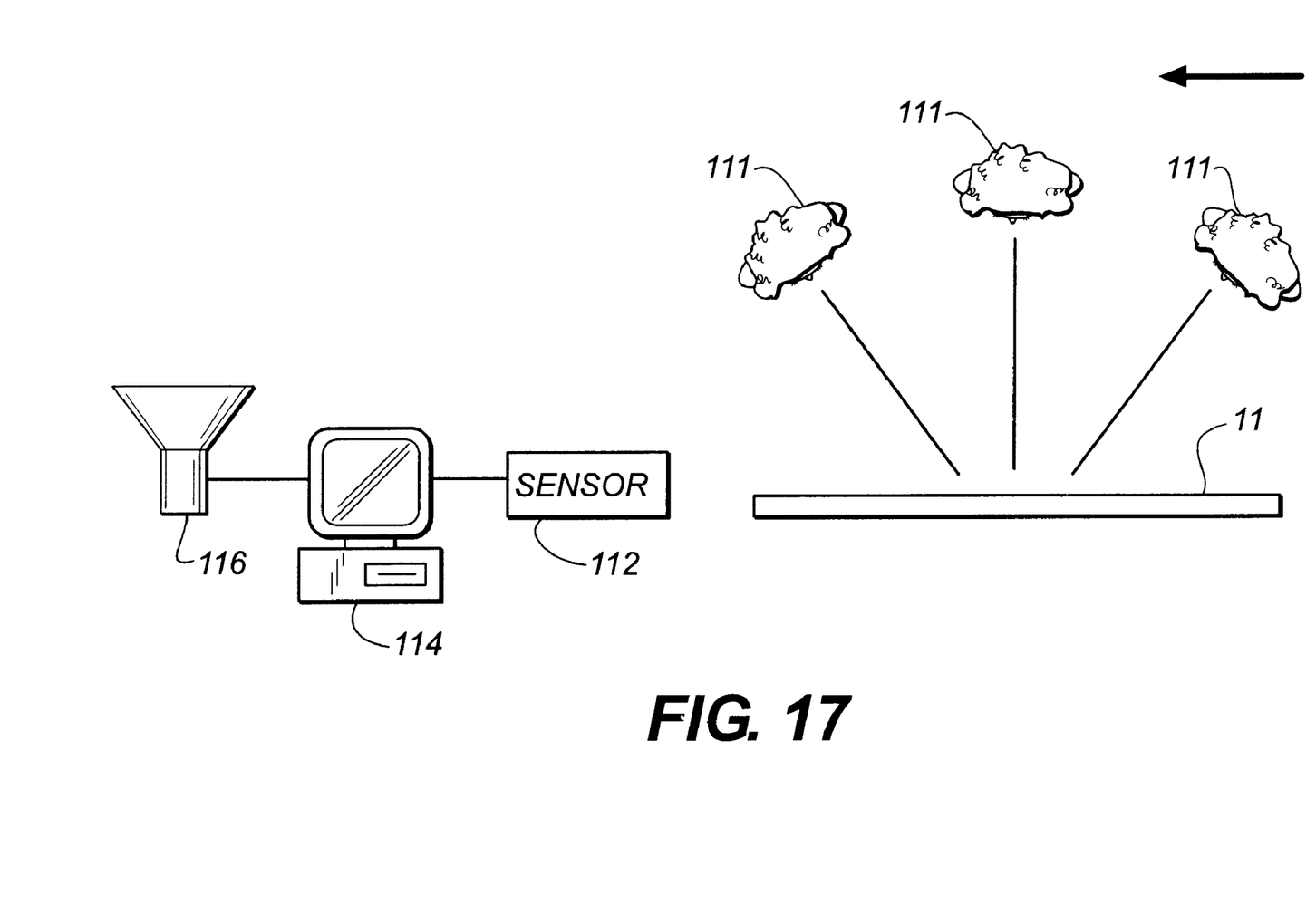
FIG. 17 is a schematic diagram of yet another system made in accordance with the present invention.

Referring to FIG. 17 there is illustrated yet another embodiment of the present invention wherein the observer 111 moves with respect to the lenticular image 11 in a manner slightly different than in the embodiment illustrated in FIG. 16, like numerals indicating like parts and operation. In particular, in the system 120 illustrated, the observer, shown in a top view, is moving generally parallel or in an arc about the lenticular image 11. As the observer 111 moves through positions 122, 123, 124, the observer will view the various images. The sound message (or plurality of sound segments) may be played in response to the position of the observer and/or may be played at a constant rate, or at a rate related to the rate of movement of the observer. Computer 114 is used to control operation of the sound generating mechanism 116. The sound message may be repeated at any desired frequency independent or dependent of the position or rate of movement of the observer. Further, the sound message may be coordinated with any direction of movement of the observer or at any desired rate or relationship.

It is to be understood that various changes and modifications may be made without departing from the scope of the present invention, the present invention being defined by the claims that follow.

| PART LIST | |
|---|---|
| 10 | article |
| 11 | lenticular image |
| 12 | front surface |
| 13 | cradle |
| 15 | bottom |
| 16 | sides |
| 17 | top |
| 18 | pins |
| 19 | axis |
| 20 | lens |
| 21 | arrow |
| 22 | extreme position |
| 24 | extreme position |
| 23 | arrow |
| 25 | top |
| 27 | bottom |
| 29 | electronics |
| 30 | lenticular sheet |
| 32 | lenticular lens |
| 34 | translation movement |
| 36 | lenticules |
| 40 | sound playback system |
| 43 | sound chip |
| 44 | speaker |
| 50 | sound playback system |
| 54 | speaker |
| 55 | audio tape cassette |
| 56 | audio tape player |
| 57 | electronic connector |
| 60 | system |
| 63 | sound chip |
| 64 | speaker |
| 65 | button |
| 68 | electric motor |
| 70 | mechanism |
| 72 | spring |
| 73 | gear |
| 74 | electric motor |
| 75 | axis of rotation |
| 76 | center |
| 77 | arrow |
| 80 | system |
| 81 | sound system |
| 84 | speaker |
| 85 | slider |
| 86a | electrical connector |
| 86b | electrical connector |
| 86c | electrical connector |
| 86d | electrical connector |
| 86e | electrical connector |
| 86f | electrical connector |
| 87 | sliding member |
| 88 | electric motor |
| 89 | electronics |
| 90 | gear |
| 91 | arrow |

-continued

| PART LIST | |
|---|---|
| 92 | rail |
| 93 | back side |
| 95 | battery |
| 96 | switch |
| 97 | shell |
| 98 | conductive liquid |
| 99a | electrical contact |
| 99b | electrical contact |
| 99c | electrical contact |
| 99d | electrical contact |
| 99e | electrical contact |
| 110 | system |
| 111 | observer |
| 112 | sensor |
| 114 | computer |
| 116 | sound reproducing mechanism |
| 120 | system |
| 122 | position |
| 123 | position |
| 124 | position |

What is claimed is:

1. An article having a lenticular image formed thereon and having a sound generating mechanism associated therewith, said lenticular image having a plurality of different images, each image being associated with a particular orientation for viewing one of said plurality of different images, said sound generating mechanism having a plurality of different sound segments, each sound segment being associated with one of said orientation for viewing, said plurality of sound messages are initiated by a switch having a shell containing a conductive liquid and a plurality of contacts, each of said plurality of contacts extending a different distance into said chamber and each being successively activated in response to orientation of said switch.

2. A method for generating a sound message with respect to a fixed lenticular image in response to movement of an observer with respect to said fixed lenticular image, comprising the steps of:

providing a lenticular image on an article having a plurality of different images capable of being viewed at different lines of sight with respect to said lenticular image;

sensing the line of sight of an observer as the observer moves with respect to said fixed lenticular image; and producing different sound segments in relationship with different lines of sight being monitored.

\* \* \* \* \*